US007269637B2

(12) United States Patent
Kubo

(10) Patent No.: US 7,269,637 B2
(45) Date of Patent: Sep. 11, 2007

(54) SERVICE PROVISION METHOD VIA A NETWORK AND SERVICE PROVISION SYSTEM USING THE SAME

(75) Inventor: Masanori Kubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 571 days.

(21) Appl. No.: 09/818,554

(22) Filed: Mar. 28, 2001

(65) Prior Publication Data

US 2002/0059436 A1    May 16, 2002

(30) Foreign Application Priority Data

Nov. 10, 2000    (JP)    ............................. 2000-343755

(51) Int. Cl.
*G06F 15/16*    (2006.01)
(52) U.S. Cl. ...................... 709/219; 709/203; 709/217; 709/223; 709/225; 709/226
(58) Field of Classification Search ................ 709/235, 709/224, 203, 217, 219, 223, 226
See application file for complete search history.

(56) References Cited

U.S. PATENT DOCUMENTS

| | | | | |
|---|---|---|---|---|
| 4,788,715 A | * | 11/1988 | Lee ............... | 379/84 |
| 5,006,983 A | * | 4/1991 | Wayne et al. ................ | 705/8 |
| 5,014,221 A | * | 5/1991 | Mogul ........................ | 358/1.14 |
| 5,452,459 A | * | 9/1995 | Drury et al. .................... | 707/3 |
| 5,828,879 A | * | 10/1998 | Bennett ....................... | 718/102 |
| 5,867,572 A | * | 2/1999 | MacDonald et al. ... | 379/266.06 |
| 6,002,760 A | * | 12/1999 | Gisby .................... | 379/266.01 |
| 6,006,269 A | * | 12/1999 | Phaal ......................... | 709/227 |
| 6,023,681 A | * | 2/2000 | Whitt ............................. | 705/8 |
| 6,055,564 A | * | 4/2000 | Phaal ........................ | 709/207 |
| 6,088,737 A | * | 7/2000 | Yano et al. ................. | 709/235 |
| 6,209,018 B1 | * | 3/2001 | Ben-Shachar et al. ...... | 718/105 |
| 6,243,706 B1 | * | 6/2001 | Moreau et al. ............. | 707/101 |
| 6,327,613 B1 | * | 12/2001 | Goshey et al. .............. | 709/208 |
| 6,389,028 B1 | * | 5/2002 | Bondarenko et al. ....... | 370/401 |
| 6,449,357 B1 | * | 9/2002 | Sashihara .............. | 379/265.09 |
| 6,470,323 B1 | * | 10/2002 | Suzuki et al. ................. | 705/27 |

(Continued)

FOREIGN PATENT DOCUMENTS

JP    08-314378    11/1996

(Continued)

OTHER PUBLICATIONS

Japanese Office Action dated Apr. 3, 2007 for corresponding Japanese Patent Application No. 2000-343755.

*Primary Examiner*—Bunjob Jaroenchonwanit
*Assistant Examiner*—Dohm Chankong
(74) *Attorney, Agent, or Firm*—Staas & Halsey LLP

(57) ABSTRACT

A service providing method and system according to which a stable access condition is maintained, losses of service providing opportunities to users are reduced and a stable service is provided via a network are provided. When an access request is sent from a user to a service providing server and an accessible number is exceeded, the server indicates information of the number of accesses to a user without immediately executing the access to said server, updates the information periodically and connects the user with the server when the server becomes accessible.

13 Claims, 6 Drawing Sheets

U.S. PATENT DOCUMENTS

| | | | |
|---|---|---|---|
| 6,519,570 B1* | 2/2003 | Faber et al. | 705/8 |
| 6,606,658 B1* | 8/2003 | Uematsu | 709/225 |
| 6,832,239 B1* | 12/2004 | Kraft et al. | 709/203 |
| 6,832,255 B1* | 12/2004 | Rumsewicz et al. | 709/227 |
| 6,845,361 B1* | 1/2005 | Dowling | 705/5 |
| 6,996,603 B1* | 2/2006 | Srinivasan | 709/204 |
| 7,099,933 B1* | 8/2006 | Wallace et al. | 709/223 |
| 2002/0101881 A1* | 8/2002 | Sundaresan et al. | 370/468 |

FOREIGN PATENT DOCUMENTS

| | | |
|---|---|---|
| JP | 2000-011074 | 1/2000 |
| JP | 2000-267975 | 9/2000 |
| JP | 2000-311134 | 11/2000 |

* cited by examiner

FIG. 6 Queuing display screen

| | |
|---|---|
| Current accessable number | 133454 |
| Your access number | 352352 |
| Estimated accessable time | About 20 minutes |

FIG. 7A Password inputting screen

| | |
|---|---|
| Current accessable number | 133454 |
| Your access number | 352352 |
| Password | |

→

FIG. 7B Screen after password authorization

You can enter this service
Click this button to access this service

[ Entrance ]

FIG. 8  A display screen of goods in stock
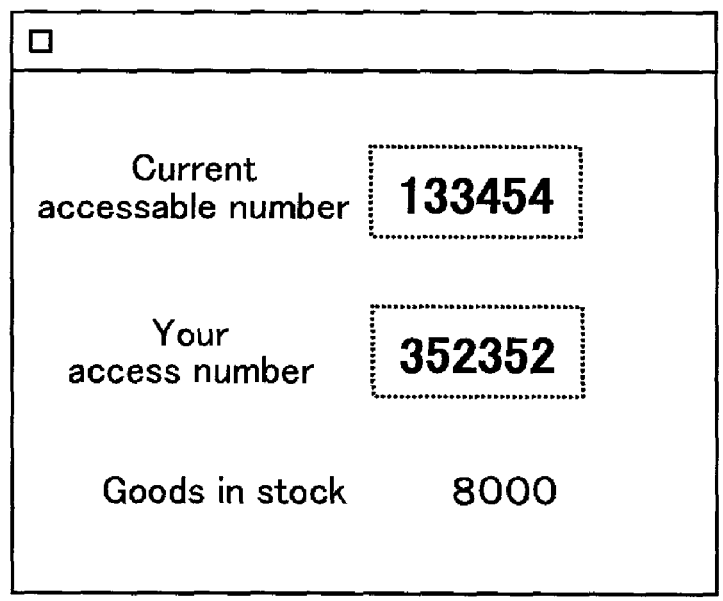
FIG. 9  A display screen showing out of stock
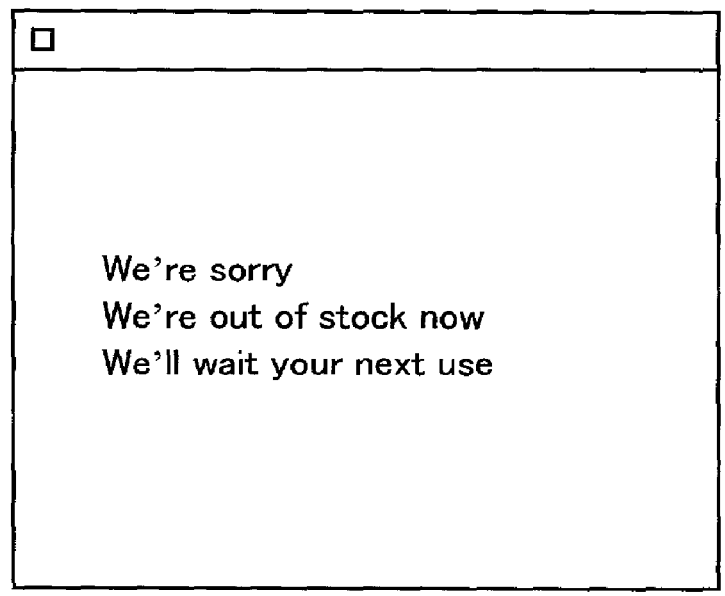

FIG. 10

A mail showing out of stock

We're sorry, we're out of stock

We're wait your next use

FIG. 11

Urging display screen 2000 users are now accessing to this service
We're afraid to access congestion
so that we're recommend your earlier use

SERVICE PROVISION METHOD VIA A NETWORK AND SERVICE PROVISION SYSTEM USING THE SAME

FIELD OF THE INVENTION

The present invention relates generally to a service provision method via a network such as the Internet, more particularly, to a service provision method and a service provision system using which a stable service is provided when access requests to a server providing the service become concentrated.

DESCRIPTION OF THE RELATED ART

Recent rapid spread of the Internet brings a plurality of service providing sites providing a variety of different services, such as information provision, commodity sales, or mail delivery. A user who wants to use these services can access the above described service providing sites and gets these services with relatively easier procedures by using a personal computer connected to the Internet.

Some service providing sites become congested because more access requests from the user become centralized at the same time because of the sites' higher popularity and the like. Accordingly, the more popular sites need to prepare a server having sufficient ability to accommodate the large number of access requests with a high performance.

In this way, the conventional service providing server via a network is designed to accommodate an estimated number of access requests, without accommodating the service providing sites on the Internet.

When more accesses over the estimated number of accesses become centralized, the server does not especially deal with the problem, and therefore, a stable service provision cannot be continued and the user cannot access the service due to lowering of the server's performance and/or termination of service caused by the centralized requests. Therefore, some service providing sites need to send messages to cope with users who cannot access the service providing sites.

However, even when the conventional method is used, the user who cannot access the service repeatedly sends the access request to the server because they cannot hold the condition of server when more accesses over the estimated number become concentrated to one service providing server, and that causes a vicious circle, such as over load on the server. Further, since the user accessing to the server does not hold the congested condition, the user is not expedited to exit and continues using the service as usual. Therefore, it is impossible to improve the congested condition of the service providing server by completing an earlier service.

Moreover, some users give up access to the site because of the congested condition without being given any indication as to when the users can access the site, and some users have a bad impression of the service providing site because of the users' inability to access the site and/or due to a response delay at the accessed time, thus there is a possibility of losing service providing opportunities.

Therefore, the conventional service providing method results in larger losses when more access requests that are over the ability of server become centralized, and effective or stable service cannot be provided to many users.

SUMMARY OF THE INVENTION

Accordingly, it is an object of the present invention to provide a service providing method and system that provide a stable service via a network by maintaining a stable access condition and reducing loss of service providing opportunities to the users when more accesses over the ability of server become centralized.

In order to attain the above object according to an aspect of the present invention, a method includes, indicating a number of accesses to a server that provides a service to a user at a time an accessible number is exceeded, when a user sends an access request to the server, with no execution of immediate access to the server, updating the information periodically, and executing the access to the server for the waiting user when the server becomes accessible. Therefore, according to the present invention, because the user concretely holds the user's own waiting state and need not access the server again until the user is informed of accessibility of the server, the conventional access repetition and the case where the user gives up access to the server are decreased. Thereby, when access requests surpass the ability of the server and become centralized, the stable access condition is maintained, loss of the service providing opportunities can be suppressed, and therefore, effective service provisions can be executed.

Further, according to the preferred mode of the above invention, when access to the server becomes available, the user is informed that the server is accessible by a display screen, voice or E-mail before executing the connection.

Additionally, according to another mode of the invention, a period of updating the information of the number of accesses is varied according to information related to the number of accesses.

According to another preferred mode of the invention, an estimated time until the server becomes accessible, which is obtained according to a time variation of the information of the number of accesses, is indicated to the user with the information of the number of accesses.

Furthermore, according to yet another mode of the invention, when a commodity sale service is provided, a number of goods in stock is indicated to the user with the information of access number.

Moreover, when the access requests to the server, which provides the service, become more than the accessible number, information of the number of accesses is indicated to all users who are using the server.

BRIEF DESCRIPTION OF THE DRAWINGS

The above and other objects, aspects, features and advantages of the present invention will become more apparent from the following detailed description of a preferred embodiment thereof.

FIG. 6 is a diagram showing one example of display screen showing information of the number of accesses when displaying an estimated time (estimated accessible time) till they can access to the site.

FIG. 7A shows one example of a display screen of urging users to input password and FIG. 7B shows one example of display screen after password authorization;

FIG. 8 is a diagram showing one example of display screen for displaying the number of goods in stock for users;

FIG. 9 is a diagram showing one example of display screen for informing no goods in stock for user;

FIG. 10 is a diagram showing one example of E mail for informing no goods in stock for users; and FIG. 11 is a diagram showing one example of urging screen displayed for the accessing user.

DETAILED DESCRIPTION OF THE PREFERRED EMBODIMENTS

Figure 1:
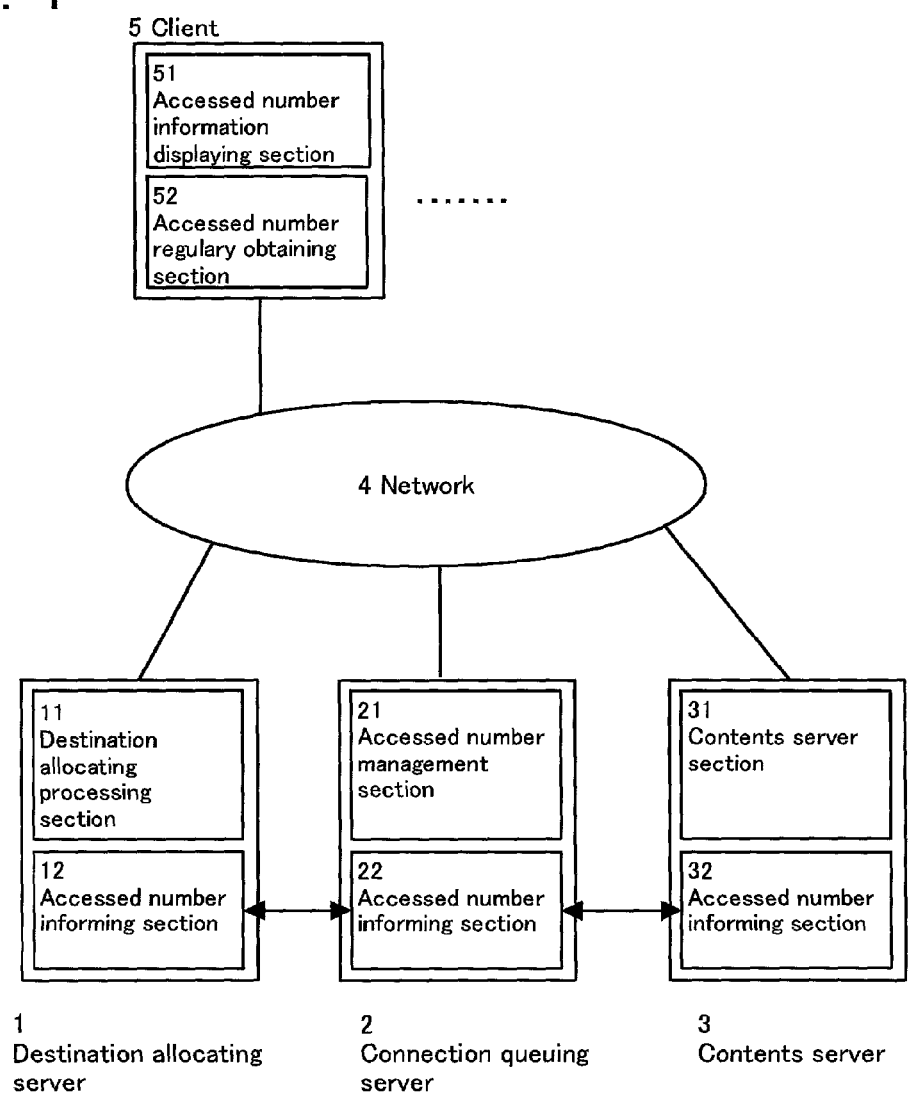
FIG. 1 is a structural diagram of a service provision system applied to the present invention.

Presently preferred embodiments of the present invention will now be described with reference to the accompanying drawings. However, such embodiments do not limit the technical scope of the present invention. The same reference numerals are used to denote and identify corresponding or identical components.

FIG. 1 is a structural diagram of a service providing system applied to the present invention. The service providing system according to the present embodiment includes a server of a service provider side, which comprises a server 1 for allocating accesses addressed to the server, a server 2 for queuing for connection and a contents server 3. Further, a section 51 for indicating information of the number of accesses and a section 52 for regularly obtaining the number of accesses in a client 5, which is a terminal machine owned by a user who gets the service provision, are provided to the service providing system.

The client 5 is a client system including a personal computer, which is accessible to the above-described server via a network, such as the Internet. Additionally, software for getting a service from the server, such as a browser for the Internet, is provided. The user of the service provision system uses the software to access the server to get the service provided. In this example, a plurality of clients 5 may exist on the network 4.

The destination allocating server 1, which includes a computer system, such as a personal computer or a workstation, takes a part of allocating the destinations of client 5 into the connection queuing server 2 or the contents server 3 when the user sends an access request through the above described client 5.

As is shown in FIG. 1, the destination allocating server 1 includes a destination allocating processing section 11 for allocating the destination and an accessed number informing section 12 for informing the number of accesses. The destination allocating processing section 11 having a unique address on the network 4 (In the case of the Internet, the unique address means URL) is connected first with the unique address when the user sends the access request, where the above described allocation is executed. Every time the user sends the access request, the destination allocating processing section 11, which manages an access number, issues a unique access number for the access request. In this example, the access number includes a total number of access requests for the particular service provision system, of which initial value is zero and increases every time an access request is received.

Further, the accessed number informing section 12 takes a part of sending and receiving information associated with the access number to the service providing system, such as the above described accessed number, to and from the connection queuing server 2. Moreover, it is desirable to implement the destination allocating processing section 11 and the accessed number informing section 12 using a computer program and a control device for executing operations according to the computer program.

Next, the connection queuing server 2 including an accessed number management section 21 and an accessed number informing section 22, as shown in FIG. 1, is a server with which the client 5 are connected when the user cannot access the contents server 3 for executing actual service provision at the time of sending the access request from the client 5, i.e., more access requests over the ability of contents server 3 are centralized.

The accessed number management section 21 having a unique address on the network 4 provides information associated with the number of accesses to this service provision system. The section 21 further manages a submitted accessible number indicating the above described access number including an upper limitation enabled to access the contents server 3. As a value of submitted accessible number, a value of a maximum connectable number of accesses to the contents server 3 (specifically, to a contents service section 31 described later) is used at the initial state, and the value is incremented every time the connection with the accessing client 5 is completed.

When the maximum connectable number is 1000, the initial value of the submitted accessible number is '1000', and the value increases each time the connection with the accessing clients 5 is completed, for example, 1001, 1002 . . . etc.

Additionally, the accessed number informing section 22 sends and receives information associated with the number of accesses between the destination allocating server 1 and the contents server 3 and updates the above-described submitted accessible number according to the information in relation to access termination, which is transmitted from the contents server 3, and similarly to the accessed number informing section 12. Further, it is desirable that the connection queuing server 2 includes a computer system, such as a personal computer or a workstation, and is implemented with the accessed number management section 21 and the accessed number informing section 22 using a computer program and a control device for executing the operation according to the program.

The contents server 3 including a contents service section 31 and the accessed number informing section 32 provides a service in the service provision system. The contents service section 31 having a unique address on the network 4 provides a variety of prepared services to the client 5 who is permitted to access this address. For example, the contents server 3 provides information and sells goods according to an operation on the client 5 owned by the user. The accessed number informing section 32 sends and receives information associated with the number of accesses to and from the connection queuing server 2.

It is also preferable that the contents server 3 includes a computer system, such as a personal computer or workstation, similar to the other servers, and to implement the contents service section 31 and the accessed number informing section 32 using a computer program and the control device executing the operations according to the program.

Subsequently, the accessed number information displaying section 51 and the accessed number regularly obtaining section 52 are activated, when one client 5 who sends one access request is connected with the above described connection queuing server 2, i.e., the client 5 waits for the connection with the above described contents service section 31, regularly obtains information relating to the number of accesses from the connection queuing server 2, and informs the queuing condition to the user by displaying the information on the client 5. According to an aspect of the invention, it is preferable that the accessed number information displaying section 51 and the accessed number regularly obtaining section 52 are implemented using Java applet transmitted from the connection queuing server 2 to the client 5 when the client 5 is connected with the connection queuing server 2.

Although the destination allocating server 1, the connection queuing server 2 and the contents server 3, are individually composed of three servers, each of which is independent, it is possible to implement operations of the three severs using one server to logically share a resource and manage the shared resource.

As is described above, in the service provision system relating to the present invention, when more access requests over that of the ability of the service providing server become concentrated, a queuing condition is periodically provided to the user until the user can access the service providing server, without immediately allowing the user to access the server, and the user can access to the server when the user becomes accessible.

Figure 2:
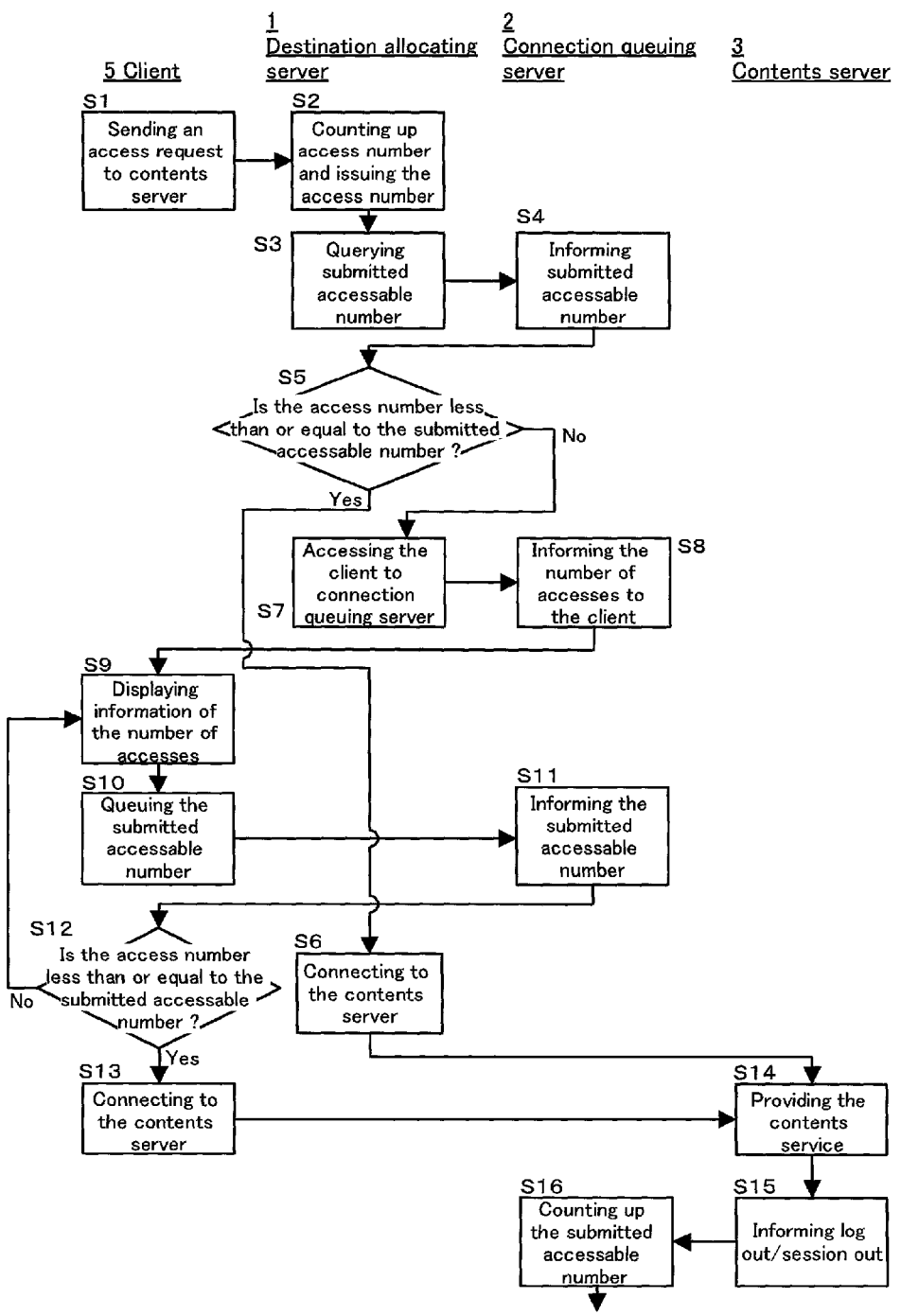
FIG. 2 is a diagram showing a processing flow chart, when an access request is sent to the service provision system according to the present embodiment.

FIG. 2 shows a flowchart describing when an access request to the service provision system according to the present invention occurs. At first, a user who employs the service provision system requests access to the service provision system from a browser of a client 5 (Operation S1 of FIG. 2). Then, the client 5 is connected with the destination allocating processing section 11 of the destination allocating server 1, and then, the destination allocating processing section 11 counts the above described access number and issues one access number for one access request (Operation S2 of FIG. 2).

Next, the destination allocating processing section 11 queries the submitted accessible number at that time to the accessed number management section 21 in the connection queuing server 2 through the accessed number informing section 12 and 22 (Operation S3 of FIG. 2), and the management section 21 transmits the submitted accessible number to the destination allocating processing section 11 in response to the query (Operation S4 of FIG. 2). The destination allocating processing section 11 compares the received submitted accessible number with the above issued access number and connects the client 5 with the contents service section 31 of the contents server 3 immediately (Operation S6 of FIG. 2) when the access number is less than the submitted accessible number (Yes of the operation S5 of FIG. 2).

As the result of the comparison, when the access number is larger than the submitted accessible number (No of the operation S5 of FIG. 2), the destination allocating processing section 11 connects the client 5 with the management section 21 of the connection queuing server 2 (Operation S7 of FIG. 2) and the client 5 becomes in the queuing state. In response, the management section 21 transmits the information of the number of accesses, i.e., the access number of the client 5 and the submitted accessible number at that time, with a program, which composes the above described accessed number information indicating section 51 and the accessed number regularly obtaining section 52 (Operation S8 of FIG. 2).

Figure 3:
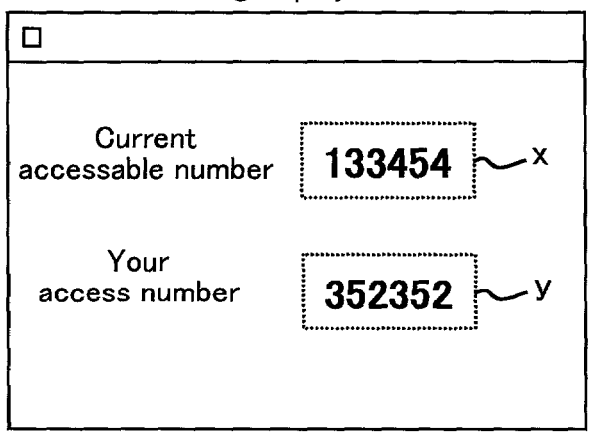
FIG. 3 is a diagram showing one example of a display screen showing information of the number of accesses.

The transmitted information of the number of accesses is displayed to the user by the accessed number information indicating section 51 on the client 5 receiving the above-described transmission (Operation S9 of FIG. 2). FIG. 3 is a diagram showing an example of the display screen. In the diagram, an x section represents the submitted accessible number and a y section represents an access number of the client 5. The user can hold the state of queuing for connection as indicated by the display screen. It is possible to display how many persons there are before connecting a certain client with the server, i.e., a value obtained by subtracting the value of x section from the value of y section shown in FIG. 3, without displaying submitted accessible number and the access number, as shown in FIG. 3.

In this way, the accessed number regularly obtaining section 52 of the queuing client 5 queries the submitted accessible number according to the above described transmitted program at predetermined constant time interval at the queuing client 5 (Operation S10 of FIG. 2). Additionally, it is possible to automatically adjust a time interval for this query based on the load on the connection queuing server 2 without fixing a time interval of this query. More specifically, the time interval for query is varied according to the number of the clients 5 for querying to the management section 21 in the access queuing state, for example, the value obtained by subtracting the value of x section from the value of y section shown in FIG. 3. Assuming that the connection queuing server 2 has a processing ability that is enough to reply to 1000 access requests at one time and requires 2 seconds for every query process, the time interval for query is set to two seconds when a number of the access queuing clients is 1000, and a time interval for query is set to ten seconds (2×(5000/1000)=10), when the number of access queuing clients becomes 5000. Thereby, the time interval for query is set to be longer, even when the number of clients 5 is larger, and the load on the connection queuing server 2 is reduced, so that a constant response performance is maintained.

The management section 21, which receives the query, transmits the submitted accessible number at that time to the client 5 (Operation S11 of FIG. 2), the accessed number regularly obtaining section 52 compares the submitted accessible number with the access number of the client 5 (Operation S12 of FIG. 2). As the result of the comparison, when the access number is larger than the submitted accessible number (No of the operation S12 of FIG. 2), i.e., the access is not permitted, the operations from the operation S9 of FIG. 2 are repeated and are executed. On the other hand, when the access number is less than the submitted accessible number (Yes of the operation S12 of FIG. 2), the accessed number regularly obtaining section 52 connects the client 5 with the contents service section 31 of the contents server 3 (Operation S13 of FIG. 2).

Figure 4:
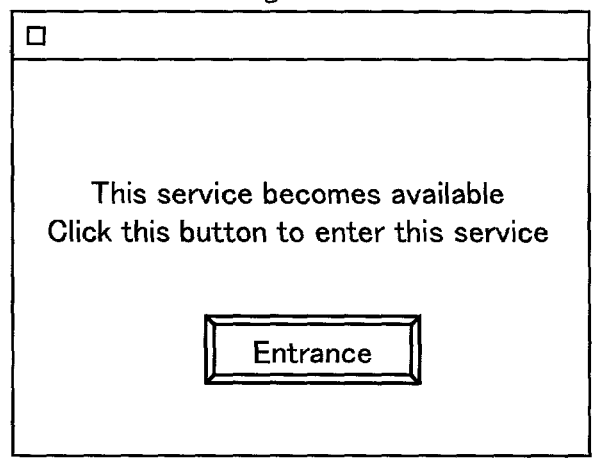
FIG. 4 is a diagram showing one example of a display screen displayed for users when access to the site becomes available.

In this embodiment, it may be executed to connect with the contents service section 31 automatically at the time of accepting the condition or it may be applied to display the connectable information on the client 5 to get the confirmation operated by the user. FIG. 4 is a diagram showing an example of a display screen displayed to the user before executing the access request. If the user wants to access the site, the user accesses to the contents service section 31 by selecting a section shown as an "entrance".

Figure 5:
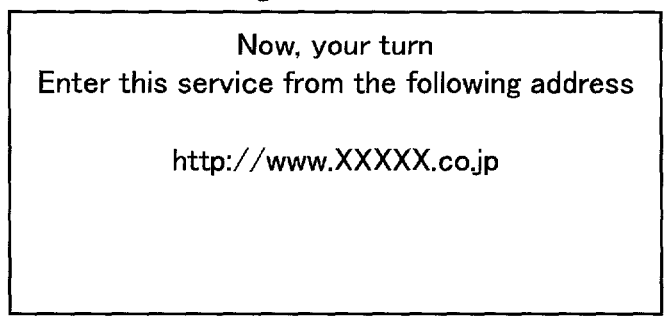
FIG. 5 is a diagram showing one example of an electric mail sending the user when access to the site becomes available.

According to an aspect of the invention, the user is informed of accessibility of the server by E-mail as shown in the example of FIG. 5. In this case, the user needs to pre-register the mail address in this service provision system, and input data to specify the mail address at some stages of the access queuing time. It is also possible to inform the user of the server's accessibility by voice. Alternatively, it may be applied that the user can select the informing methods using by a display screen, E-mail or voice.

In the present embodiment, although the operations S9, S10, S12 and S13 of FIG. 2 are executed at the client 5 according to a program like Java applet transmitted to the client 5, it may be applied to execute these operations at the connection queuing server 2. In this case, when information of the number of accesses is displayed to the client 5, it can be applied to transmit a HTML file of the display screen displaying the information of the number of accesses from the connection queuing server 2.

Returning back to FIG. 2, if the client 5 can access to the contents server 3 (Operations S6 and S13 of FIG. 2), the user can get the service providence prepared at the contents service section 31 (Step S14 of FIG. 2). After that, when the user finishes (logs out) accessing the contents server 3 or the contents server 3 forces finishing (sessions out) access of the user with because of no access from the user, etc. the contents service section 31 informs the same to the management section 21 through the accessed number informing sections 32 and 22 (Operation S15 of FIG. 2). The management section 21, which receives the information, counts the submitted accessible number according to the access termination information (Operation S16 of FIG. 2).

Although operations from the time of sending an access request to the service provision system to the time of finishing the connection are explained above, the overflowed access requests are connected with the connection queuing server not to the service provision server when more access requests over the ability of server, which provides services, become centralized in this service provision system. Even if more access requests become centralized, therefore, a stable service provision is executed without lowering the response performance of the server, which provides a service. Additionally, the queuing state is concretely shown to the queuing user in figures, and therefore, the conventional access request repeating operation is prevented. Moreover, since the user can estimate the waiting time before the user can access, the possibility that the user thoughtlessly gives up the service is decreased and the user waits easily by effectively using the waiting time for executing some other operations until the user can access the service.

As the modified example according to the above-described embodiment, it may be applied to display the estimated time (estimated accessible time) for the queuing user with the information of the number of accesses. FIG. 6 shows an example of the display screen at that time. The bottom section of the display shows the above described estimated time. In this example, the user is notified that it takes about twenty minutes to access the service. Moreover, the estimated time (estimated accessible time) is obtained according to the condition of counting or increasing the submitted accessible number as described below.

The accessed number management section 21 of the connection queuing server 2 that manages the submitted accessible number holds the condition of counting the number according to a predetermined timing and transmits information of the condition of counting the number in addition to the accessed number information every time queuing is received from the accessed number regularly obtaining section 52. The accessed number regularly obtaining section 52 of the client 5, which receives the transmission, calculates the above-described estimated time (estimated accessible time) from the information of the number of accesses and the information showing the condition, and displays the value to the user on the accessed number information displaying section 51.

When the submitted accessible number is counted up to 1000 for five minutes, for example, the submitted accessible number is 10000 and the access number is 30000, the estimated time (estimated accessible time) is obtained by calculating (30000−10000)=1000×5 minutes=100 minutes. In this way, the users maintain the queuing condition accurately, the user is informed of the estimated time in addition to the information of the number of accesses, and therefore, allows effective service to be provided to the user. Moreover, it also becomes possible to obtain the estimated time (estimated accessible time) at the connection queuing server 2 and transmit the result to the client 5.

FIG. 7A and FIG. 7B are diagrams for explaining other examples of the invention. The example shows a display screen prompting the user to input a password and allowing access of the client 5, which the user uses, immediately to the contents server 3 regardless of the number of access requests at that time when the inputted password is correct. The user's password input maybe executed at the first access request or the password input may be executed on a display screen of the information of the number of accesses displayed to the user while the user is queuing.

FIG. 7A shows an example of the input display screen of the latter case. If the user inputs a password on the display screen and the input password coincides with one of passwords pre-registered at the connection queuing server 2, the contents server 3 becomes accessible to the user, and the display screen as shown in FIG. 7B is displayed on the client 5. In this example, the user connects with the contents server 3 to get the service provided by selecting a section shown as "Entrance". Additionally, in the modified example, a password authentication section for authentication of the above-described password and a password record section for registering the password are provided at the connection queuing server 2. The addition of the password inputting function makes it possible to execute rapid service provision for specified user at a certain occasion.

Moreover, when the service provision is targeted for commodity sales, a display of the number of goods in stock with the information of the number of accesses is provided. This is a case where a service called a shopping mall is provided, and FIG. 8 shows an example of the display screen displayed for the user. In this case, the management section 21 of the connection queuing server 2 obtains the information every time the goods are sold from the contents server 3, obtains the number of goods in stock, and transmits the number of goods in stock with the information of the number of accesses when querying from the accessed number regularly obtaining section 52 to the client 5. Moreover, the number of goods in stock may be obtained at the contents server 3 at selling time of every good.

Additionally, when the number of goods in stock becomes zero, not only zero is displayed on the above described display screen, but a special display screen that shows no stock is displayed to the clients, for example, a message to indicate no stock. FIG. 9 is a diagram showing an example of the display screen. Furthermore, a method for transmitting e-mail as shown in the example of FIG. 10 to the registered address of the user and a method for transmitting the information of no stock from the client 5 to the user by voice are used instead of the display screen showing no stock. In this way, in the service provision system, which provides a commodity sale service, not only loss of providing services to the user is decreased but the load on the server caused by the user's access regardless whether there are goods is reduced.

Moreover, when more access requests over the ability of the service providing system become concentrated and the queuing clients 5 exist, a display screen for prompting the users who are accessing the contents server 3 to complete the service of the previous access is provided. FIG. 11 is a diagram showing an example of the display screen. In this modified example, when the accessed number becomes larger than the submitted accessible number, the management section 21 of the connection queuing server 2 transmits the information to the contents service section 31 of the contents server 3, the contents service section 31 receives the information and transmits the above described urging screen to the accessing clients 5. The display screen prompts the user to use the service earlier, because of user's apprehension for response speed delay or out of stock in the commodity sale service. As the result, the user finishes to access the contents server 3 earlier than usual so that the access condition can be improved, when access requests become concentrated.

Hereinabove, according to a service provision system of the present invention, it becomes possible to keep stable access condition of the server providing the service, even when access requests become concentrated, and to reduce losses of service providing opportunities. Therefore, it is possible to execute effective and stable service provision to users.

It should of course be understood that those, which are the same as the technical concept of the invention, are within the protective scope of the invention.

According to the present invention, even when users cannot access a desired server immediately, the users maintain respective conditions and have no need to access the server again until the server becomes accessible, and therefore, the conventional access repetition is decreased and the user's unreasonable giving up of access is also decreased. Therefore, even if access requests over the ability of the server occurs, it is possible to keep stable access condition and decrease the losses of service providing opportunities, and therefore, effective service provision is executed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A service provision method for service provision from a server connected with clients via a network, comprising:
   judging whether said server is accessible by comparing an access number and a submitted access number in response to an access request from a first client among said clients to said server, said access number being incremented and being issued responsive to each request to said server and being unique for said request and said submitted access number being incremented responsive to each completion of providing a service from the said server;
   immediately connecting said first client with said server when the server is judged accessible;
   suspending an access request of a second client among said clients and displaying information of a number of accesses to said server on said second client, said information of the number of accesses directly or indirectly indicating a number of uncompleted requests according to said unique access number for said access request of the second client and said submitted access number, when the server is judged inaccessible;
   displaying an updated said information of the number of accesses that is updated at a time interval according to said submitted access number queried by said second client after displaying said information of the number of accesses; and
   automatically connecting said second client whose access request is suspended with said server at a time when said server becomes accessible based on a determination of accessibility by said second client, the server being accessible when said access number of said second client is less than or equal to said submitted access number after displaying said information of the number of accesses,
   wherein said time interval is varied according to said information of the number of accesses and the time interval is set to be longer as a number of clients in an access querying state increases.

2. A service provision method according to claim 1, wherein when said server is accessible, information that shows said server is accessible is displayed on said first client before access to said server.

3. A service provision method according to claim 1, wherein when said server is accessible, a message indicating that said server is accessible is uttered by voice from said first client before access to said server.

4. A service provision method according to claim 1, wherein when said server is accessible, an E-mail that indicates said server is accessible is sent to a pre-registered mail address of said user before access to said server.

5. A service provision method according to claim 1, wherein said information of the number of accesses displayed on said second client includes said access number and said submitted access number.

6. A service provision method according to claim 1, wherein when said information of the number of accesses is displayed on said second client, an estimated time of when said server becomes accessible, which is obtained according to a time varied condition of said information of the number of accesses, is displayed.

7. A service provision method according to claim 1, further comprising:
   requesting a password input from said user before the said server becomes accessible, and allowing access of said second client to said server upon the password input, regardless of said determination whether said server becomes accessible when authorizing that said input password is correct.

8. A service provision method according to claim 1, wherein when said provided service is for commodity sales, a number of sellable goods in stock is further displayed at the time of displaying said information of the number of accesses on said second client.

9. A service provision method according to claim 8, wherein said number of sellable goods in stock becomes zero, information that shows the commodity sales of goods is finished is displayed on said second client.

10. A service provision method according to claim 8, wherein when said number of sellable goods in stock becomes zero, a message that indicates said commodity sales of goods is finished is uttered by voice from said second client.

11. A service provision method according to claim 8, wherein when said number of sellable goods in stock becomes zero, an E-mail that indicates said commodity sales of goods is finished is sent to a pre-registered mail address of said user.

12. A service provision method according to claim 1, further comprising:

displaying said information of the number of accesses for said second client accessing to said server upon determining that said server is inaccessible.

13. A service provision method for service provision using clients connected with a server via a network, comprising:

determining whether said server is accessible by comparing an access number and a submitted access number via a first client among said clients when said first client sends an access request to said server, said access number being incremented and being issued responsive to each request to said server and being unique for said request and said submitted access number being incremented responsive to each completion of providing a service from the said server;

immediately connecting said first client with said server upon determining that said server is accessible;

suspending an access request of a second client among said clients and displaying information of a number of accesses of said server via said second client upon determining that said server is not accessible, said information of the number of accesses directly or indirectly indicating a number of uncompleted requests according to said unique access number for said access request of the second client and said submitted access number;

displaying an updated said information of the number of accesses via said second client, where the information is updated at a time interval according to said submitted access number queried by said second client after displaying said information of the number of accesses; and automatically connecting said second client whose access request is suspended with said server when said server becomes accessible based on a determination of accessibility by said second client, the server being accessible when said access number of said second client is less than or equal to said submitted access number after displaying said information of the number of accesses, wherein said time interval is varied according to said information of the number of accesses and the time interval is set to be longer as a number of clients in an access querying state increases.

* * * * *